US010552912B1

(12) United States Patent
Roll et al.

(10) Patent No.: US 10,552,912 B1
(45) Date of Patent: Feb. 4, 2020

(54) INTEGRATED INVESTMENT AND INSURANCE ACCOUNTS (71) Applicant: STATE FARM MUTUAL AUTOMOBILE INSURANCE COMPANY, Bloomington, IL (US)

(72) Inventors: Leif Agerholm Roll, Bloomington, IL (US); Scott Alexander Hintz, Bloomington, IL (US); Andrew Patrick Wieduwilt, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 75 days.

(21) Appl. No.: 14/528,446

(22) Filed: Oct. 30, 2014

(51) Int. Cl.
*G06Q 40/00* (2012.01)
*G06Q 40/08* (2012.01)
*G06Q 40/06* (2012.01)

(52) U.S. Cl.
CPC .............. *G06Q 40/08* (2013.01); *G06Q 40/06* (2013.01)

(58) Field of Classification Search
CPC ......... G06Q 40/10; G06Q 40/06; G06Q 40/04
USPC ....................................................... 705/36 T
See application file for complete search history.

(56) References Cited

U.S. PATENT DOCUMENTS

| 4,969,094 | A | | 11/1990 | Halley et al. | |
|---|---|---|---|---|---|
| 5,644,727 | A | * | 7/1997 | Atkins | G06Q 20/102 |
| | | | | | 705/40 |
| 5,913,198 | A | * | 6/1999 | Banks | G06Q 40/00 |
| | | | | | 705/36 R |
| 6,950,805 | B2 | | 9/2005 | Kavanaugh | |
| 7,089,202 | B1 | * | 8/2006 | McNamar | G06Q 40/00 |
| | | | | | 705/35 |
| 7,343,333 | B2 | | 3/2008 | Menke | |
| 8,346,648 | B1 | | 1/2013 | Kosmos | |
| 8,682,700 | B2 | | 3/2014 | Ferguson et al. | |
| 2002/0165740 | A1 | * | 11/2002 | Saunders | G06Q 40/08 |
| | | | | | 705/4 |

(Continued)

OTHER PUBLICATIONS

Investment Company Institute ("Frequently Asked Questions About Mutual Fund Fee Disclosure" Investment Company Institute http://www.ici.org/faqs/faq/faqs_fee_disclosure Dec. 8, 2012).*

(Continued)

*Primary Examiner* — Bruce I Ebersman
*Assistant Examiner* — Mark H Gaw
(74) *Attorney, Agent, or Firm* — Marshall, Gerstein & Borun LLP (57) ABSTRACT

The techniques disclosed herein generally relate to providing insurance via an integrated investment and insurance account. An integrated account may have an owner, and may include an investment vehicle portion and an insurance policy portion. The investment vehicle portion may include or be associated with one or more investment vehicles via which the account owner may invest money and, based on the invested funds, the insurance policy portion may provide insurance for which the account owner is designated as the insured party. Premiums for the insurance policy portion may be borne by the operating expenses of the investment vehicle portion. Additionally, a payout or benefit amount of the insurance provided by such integrated accounts may be based on the value of accumulated assets under management of the investment vehicle portion at the time of the payout.

19 Claims, 2 Drawing Sheets

(56) References Cited

U.S. PATENT DOCUMENTS

| | | | |
|---|---|---|---|
| 2006/0136273 A1* | 6/2006 | Zizzamia | G06Q 40/08 |
| | | | 705/4 |
| 2009/0063198 A1* | 3/2009 | Chien et al. | 705/4 |
| 2009/0198630 A1* | 8/2009 | Treitler | G06Q 40/06 |
| | | | 705/36 R |
| 2009/0228306 A1* | 9/2009 | Izyayev et al. | 705/4 |
| 2010/0325064 A1* | 12/2010 | Stone | G06Q 40/06 |
| | | | 705/36 R |
| 2012/0095904 A1* | 4/2012 | Katsuyama | G06Q 20/10 |
| | | | 705/39 |
| 2014/0195271 A1 | 7/2014 | Sexton | |

OTHER PUBLICATIONS

Barker, Bill ("The Truth About Mutual Funds Expense Ratios" The Motley Fool http://www.fool.com/school/mutualfunds/costs/ratios.htm Apr. 1, 2001).*

Investment Company Institute ("Frequently Asked Questions About Mutual Fund Fee Disclosure" Investment Company Institute http://www.ici.org/faqs/faq/faqs_fee_disclosure Dec. 8, 2012). (Year: 2012).*

U.S. Appl. No. 13/941,402, filed Jul. 12, 2013.

* cited by examiner

INTEGRATED INVESTMENT AND INSURANCE ACCOUNTS

FIELD OF THE DISCLOSURE

This disclosure generally relates to an account that enables its owner to obtain insurance having a payout that tracks with the value of an investment.

BACKGROUND

Customers may purchase investment vehicle products and insurance policies separately, as separate transactions for separate, unrelated products. Some products currently on the market, though, do associate investment vehicles and insurance policies. For example, U.S. Pat. No. 8,346,648 is directed to donating an annuity to a charitable organization, and further using the annuity to purchase a life insurance policy for the donor. Accordingly, the charitable organization receives any gains generated by the annuity while the donor is living. U.S. Pat. No. 6,950,805 is directed to using annuities that are purchased in part using borrowed money to fund life insurance policies via various business and trust structures to reduce tax consequences. U.S. Patent Application No. 20140195271 is directed to using the gains of an annuity to pay for life insurance premiums and avoid taxation of the gains generated by the annuity.

Generally, the above examples and other similar products do not return the gains generated by an investment immediately to the investment account owner to do with as he or she wishes, as most of these types of products are directed to reducing or eliminating the tax consequences on said gains. Furthermore, typically most of these types of products require a full underwriting process to be used to approve the associated insurance policies.

SUMMARY

In an embodiment, a system for providing insurance by using an integrated investment vehicle and insurance policy account may comprise a computing device having a processor and a memory, and an integrated account provider. The integrated account provider may comprise a set of computer-executable instructions for providing integrated investment and insurance accounts. The set of computer-executable instructions may be stored on the memory of the computing device, thereby particularly configuring the computing device for providing the integrated investment vehicle and insurance policy account. The integrated investment vehicle and insurance policy account may be an integrated account, and the computer-executable instructions may be executable by the processor to cause the computing device to establish an investment vehicle portion of the integrated account, where the investment vehicle portion includes an indication of an amount of funds invested by an owner of the integrated account in one or more investment vehicles and an indication of an operating expense assessed on at least a part of the amount of funds. Further, the computer-executable instructions may be executable by the processor to cause the computing device to establish an insurance policy portion of the integrated account, where the insurance policy portion includes an indication of the account owner being designated as an insured party of at least one insurance policy, and an indication that an amount of a payout of the at least one insurance policy is to be based on a value of total assets under management (AUM) of the one or more investment vehicles at a time of the payout. Still further, the computer-executable instructions may be executable by the processor to cause the computing device to cause at least a portion of the operating expense assessed on the at least the part of the amount of funds to be paid towards a premium of the at least one insurance policy, thereby providing insurance to the account owner.

In an embodiment, a system for providing insurance by using an integrated investment vehicle and insurance policy account (e.g., an integrated account) may include a first memory configured to store an indication of an operating expense of an investment vehicle portion of the integrated account. The investment vehicle portion may correspond to funds invested by an owner of the integrated account in one or more investment vehicles, and may indicate the operating expense assessed on at least one of the one or more investment vehicles. The system may further include a computing device having a processor communicatively connected to the first memory, a second memory, and a set of computer-executable instructions for providing integrated investment and insurance accounts. The set of computer-executable instructions may be stored on the second memory of the computing device, thereby particularly configuring the computing device to provide the integrated account. The set of computer-executable instructions may be executable by the processor to cause at least a portion of the assessed operating expense of the investment vehicle portion of the integrated account to be applied towards a premium of an insurance policy corresponding to an insurance policy portion of the integrated account, thereby providing insurance to the integrated account owner. Further, the integrated account owner may be an insured party of the insurance policy, and an amount of a payout of the insurance policy may be based on a value of total assets under management (AUM) of the one or more investment vehicles at a time of the payout.

In an embodiment, a system for providing insurance via an integrated investment and insurance account may include a computing device having a processor, a memory, and a set of computer-executable instructions for providing integrated investment and insurance accounts. The set of computer-executable instructions may be stored on the memory of the computing device, thereby particularly configuring the computing device for providing the integrated investment and insurance account. Additionally the integrated investment and insurance account may be an integrated account, and the computer-executable instructions may be executable by the processor to cause the computing device to augment an established investment account with an application for an insurance policy to generate the integrated account, wherein the established investment account is opened by an account owner and has an operating expense, the account owner is designated as an insured party of the insurance policy, and an amount of a payout of the insurance policy is to be based on a value of total assets under management (AUM) of the established investment account at a time of the payout. Further, the computer-executable instructions may be executable by the processor to cause an underwriting process to be performed on the application for the insurance policy, where the underwriting process is a subset of an underwriting process designated to be performed for an application for a stand-alone insurance policy that does not augment any investment account of the account owner. Still further, the computer-executable instructions may be executable by the processor to receive an approval from the underwriting process performed on the application of the insurance policy and, based on the approval, include the approved insurance policy in the integrated account; and cause at least a portion of monies received in response to an assessment of the operating expense on the established investment account to be paid towards a premium of the insurance policy, thereby providing insurance to the account owner.

DETAILED DESCRIPTION

The novel methods and systems disclosed herein generally relate to enabling an owner of an investment account to obtain insurance via an integrated investment and insurance account (which, for ease of reading, is referred to interchangeably herein as an "integrated account"). An integrated account may include an investment vehicle portion and an insurance policy portion. The investment vehicle portion of the integrated account may include or may be associated with one or more investment vehicles in which the account owner may invest money. The insurance policy portion of the integrated account may provide insurance based on the invested funds for the account owner, e.g., the account owner may be designated as an insured party of the insurance provided by the integrated account. Typically, the underwriting process used to obtain the insurance provided by the insurance policy portion of the integrated account may be a simplified, pared-down underwriting process as compared to the underwriting process that is typically required to obtain a same type of insurance policy for the account owner via a stand-alone insurance product.

The investment vehicle portion and the insurance policy portion of the integrated account are referred to herein as being "integrated," as various parameters or terms of one portion are dependent on various parameters or terms of the other portion. In an embodiment, one or more financial parameters of the insurance policy portion may be dependent on one or more financial parameters of the investment vehicle portion. For example, premiums for the insurance provided by the insurance policy portion may be covered by (e.g., paid from) monies received from the assessment(s) of operating expenses of the investment vehicles associated with or included in the investment vehicle portion. As such, the premiums for the insurance policy portion of the integrated account may be borne by the operating expenses of the investment vehicle portion of the integrated account. Further, the insurance policy portion of the integrated account may be structured so that a payout or benefit amount of the insurance provided thereby may be based on the value of accumulated assets under management (AUM) of the investment vehicle portion at the time of the payout. That is, the amount of the payout or the benefit may track with the value of one or more investment vehicles associated with the investment vehicle portion. For example, a payout amount of the insurance may be the entirety of the value of the total accumulated AUM of the investment vehicle portion at the time of the payout, or may be a portion of the value of the total accumulated AUM, e.g., a percentage, a fixed amount, etc.

Typically, integrated investment and insurance accounts do not aim to optimize insurance premium amounts or amounts of coverage for the account owner. Rather, integrated accounts provide a vehicle via which the account owner may easily and conveniently obtain insurance. Indeed, in some scenarios, an integrated account may be created by adding the insurance policy portion to an existing investment account of the account owner, e.g., by augmenting an established investment account with a dependent insurance policy.

Further, in addition to enabling the account owner to easily and conveniently obtain insurance, such integrated investment and insurance accounts may also provide benefits to the providers of the integrated accounts. For example, by offering integrated investment and insurance accounts, providers may attract a wider customer base, may increase sales, and/or may increase profits. Of course, integrated investment and insurance accounts must meet insurance regulatory and actuarial standards as well as securities regulations. Furthermore, integrated investment vehicle and insurance accounts must comply with all applicable local, state and federal laws.

Still further, integrated investment and insurance accounts lessen the amount of computing resources required to set up and administrate the product as compared to separate investment and insurance accounts. Separate investment vehicle and insurance policy products require at least double the amount of memory to store and track account information, not to mention additional processor usage and network traffic that is required to separately administrate the two accounts. Additionally, with separate accounts, additional computing resources (e.g., memory, processing resources, network traffic, etc.) are required when an applicant is required to go through multiple rounds of underwriting. Having a single, integrated account may significantly reduce (e.g., reduce by about half) the amount of memory, processing resources, and bandwidth required for two separate accounts. Accordingly, computing resources are optimized and freed up to perform other tasks.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, as used herein, the terms "integrated investment and insurance account provider," "integrated account provider," or "provider" are used interchangeably to generally refer to a party or entity (e.g., a business or other organizational entity) that provides integrated investment and insurance products, e.g., by offering and providing integrated investment vehicles and insurance policies. Typically, but not necessarily, an integrated investment and insurance account provider may be an insurance company or a financial services company.

Additionally, the terms "insured," "insured party," and "policyholder" are used interchangeably herein to refer to the owner of the integrated investment and insurance account, e.g., a person or party who is covered by the insurance policy. A "guarantor," as used herein, generally refers to a person, party or entity that is responsible for providing the insurance premiums. The guarantor may or may not be the same party as the insured, such as in situations when a guarantor has power of attorney for the insured.

Further, the term "insurance" or "insurance policy," as used interchangeably herein, generally refers to a contract between an insurer and an insured. Typically, the insurer may be the provider of the integrated account, the insured may be the owner of the integrated account. In exchange for payments paid on behalf of the insured, the integrated account provider may provide one or more insurance payouts (which also may be referred to interchangeably herein as a "benefit" of the insurance or insurance policy) as specified by the language of the insurance policy included in or associated with the integrated account. The payments on behalf of the account owner or the insured are generally referred to as "premiums," and typically are paid over time at periodic intervals. For integrated accounts in particular, the premiums for the insurance policy portion of the integrated account may be paid over time using at least a portion of the periodic operating expenses that have been assessed for the investment vehicle portion of the integrated account, in an embodiment.

Additionally, the insurance or insurance policy provided by the integrated account may remain (or have a status or state of) "in-force" after the application has been approved and while the integrated account remains open and premium payments are being made. An insurance policy may "lapse" (or have a status or state of "lapsed"), for example, when premium payments are not being paid, when the insured or the insurer cancels the policy, or when the account owner closes the integrated account.

An integrated account may provide one or more different types of insurance, insurance products, or insurance policies, any one or more of which may be integrated with one or more investment vehicles. Typically, the types of insurance which may be integrated with investment accounts are types of insurance for which the account owner may be designated as the insured party, e.g., life insurance, disability insurance, long-term care insurance, personal liability insurance, personal umbrella insurance, or any other type of insurance for which the account owner may be designated as the respective insured party. Based on the current laws and regulations at the time of this disclosure, typically the types of insurance policies which may be integrated with investment accounts may correspond to types of insurance that are not tax-qualified and that are not tax-deferred, although this restriction may be altered if the laws and/or regulations change.

The term "investment vehicle," as used herein, generally refers to a product used by the account owner with the intention of having positive financial returns. Types of investment vehicles may include, for example, stocks, bonds, mutual funds (e.g., stock funds, index funds, bond funds, money market funds, mixed asset funds, hedge funds, etc.); checking accounts; savings accounts; certificate of deposits; other interest bearing vehicles; ETFs; brokerage accounts; investment management accounts; and other types of investment vehicles. Typically, an investor opens an integrated investment and insurance account (or opens a stand-alone investment account which may be converted into or included into an integrated account) corresponding to one or more particular investment vehicles, and provides an initial contribution that is equivalent to a monetary value. Based on the current laws and regulations at the time of this disclosure, typically the types of investment vehicle accounts which may be integrated with insurance policies correspond to investment vehicles that are not tax-deferred and that are not tax-qualified, although this restriction may be altered if the laws and/or regulations change.

An integrated investment and insurance provider may offer, provide, or allow one or more types of investment vehicles for integration with insurance policies. Indeed, in an embodiment, any one or more types of investment vehicles may be integrated with any one or more types of insurance policies to form an integrated investment and insurance account. In some scenarios, multiple investment accounts of multiple types may be integrated with multiple insurance policies to form an integrated investment and insurance account.

Figure 1:
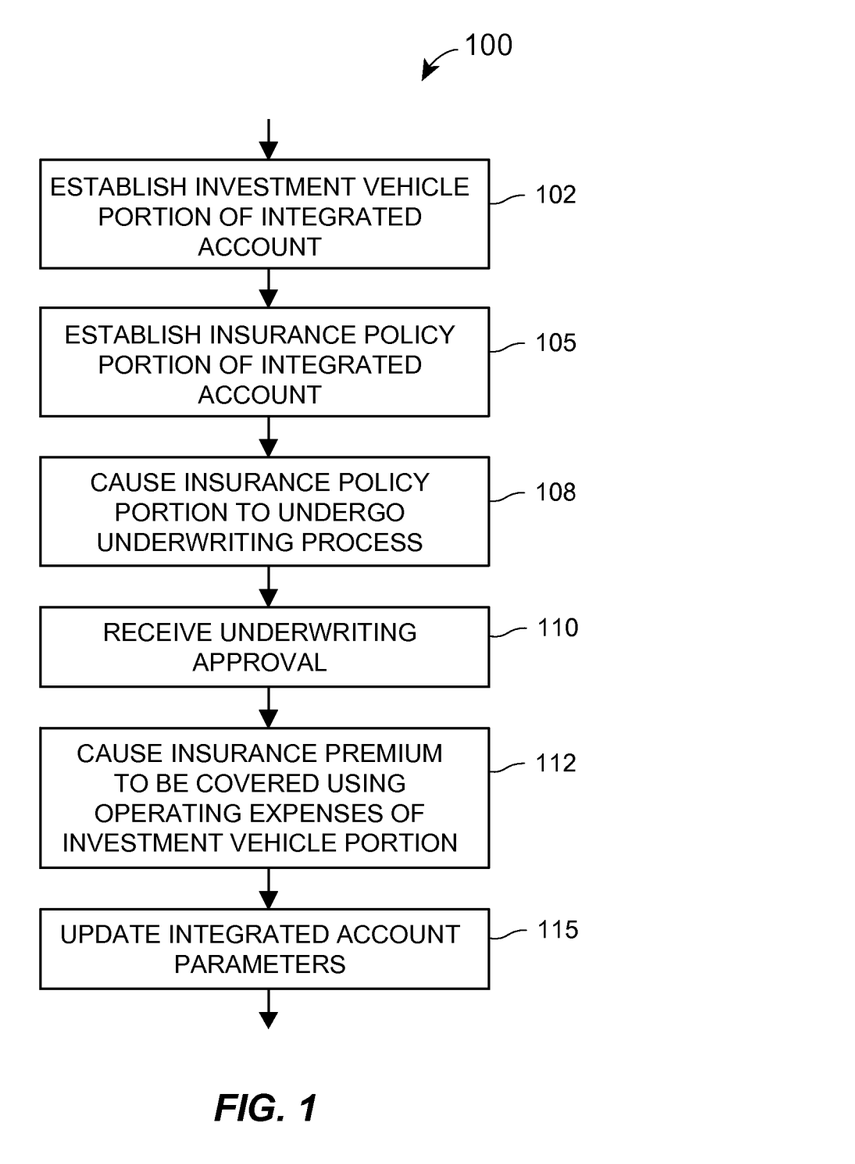
FIG. 1 is an example method of providing insurance using an integrated investment and insurance account.

Turning now to FIG. 1, FIG. 1 illustrates an example method 100 for providing insurance using an integrated investment and insurance account. At least a portion of the method 100 may be performed by one or more computing devices, in an embodiment.

The method 100 may include establishing an investment vehicle portion of an integrated investment and insurance account (block 102). The investment vehicle portion may include or may be associated with funds that are provided or contributed by the account owner and that are invested in one or more investment vehicles. For example, the account owner may provide an initial principal amount for investment in the one or more investment vehicles, and at later dates may provide additional funds for investment. The one or more investment vehicles may provide respective returns, which the account owner may do with as he or she pleases, e.g., re-invest, withdraw, transfer to a different account, etc.

The one or more investment vehicles included in the investment vehicle portion of the integrated account may be, for example, stocks, bonds, mutual funds (e.g., stock funds, index funds, bond funds, money market funds, mixed asset funds, hedge funds, etc.); checking accounts; savings accounts; certificate of deposits; other interest bearing vehicles; ETFs; brokerage accounts; investment management accounts; and other types of investment vehicles. Typically, investment vehicles that are utilized in integrated accounts may exclude tax-deferred investment vehicles, such as retirement accounts, health savings accounts, and certain types of annuities. In some scenarios, all annuities may be excluded from being utilized in integrated accounts.

Additionally, an investment vehicle that is utilized by an integrated account typically may have an assessed operating expense. In an embodiment, the operating expense may be assessed based on a percentage of the value of current assets under management (AUM). Additionally or alternatively, the operating expense may be a fixed amount, e.g., a fixed currency amount such as a fixed dollar amount. For example, if the value of AUM falls below a certain predetermined value, the operating expense may be assessed as a fixed amount, whereas if the value of the AUM is above the certain predetermined value, the operating expense may be assessed as a percentage of the value of current AUM. In some cases, different assessment percentages may be utilized for different ranges of AUM. For some investment vehicles, the operating expenses are assessed periodically, and for other investment vehicles, the operating expenses are assessed when funds are deposited into the account (e.g., initially, and when additional funds are added by the account owner). For example, either a percentage of the deposited funds or a fixed amount may be assessed when initial or additional funds are deposited.

In an embodiment, establishing the investment vehicle portion of the integrated account may include storing an indication of the integrated account owner, an indication of a current balance of the one or more investment vehicles, and/or an indication of the designated operating expense assessment structure or protocol. In some embodiments, indications of other parameters corresponding to the investment vehicle portion may be stored, for example, current balances of each of the investment vehicles included therein or associated therewith, dates and amounts of assessed operating expenses, other account activity, etc.

At a block 105, the method 100 may include establishing an insurance policy portion of the integrated investment and insurance account. Establishing the insurance policy portion may include initially receiving respective applications for one or more insurance policies, each of which may designate the account owner as a respective insured party. When the respective applications are approved, the insurance policy portion of the integrated account may then include the one or more approved, in-force insurance policies.

During establishment of the insurance policy portion (block 105), the account owner may submit or provide an application for a particular type of insurance policy. Type of insurance policies that may be applied for as part of an integrated account may include any type of insurance policy for which the account owner may be designated as an insured party, e.g., life insurance; disability insurance; long-term care insurance; personal liability insurance; personal umbrella insurance, etc. As such, establishing the insurance policy portion of the integrated account (block 105) may include storing an indication of the type of insurance policy that is applied for, included in, or associated with the insurance policy portion, and storing an indication that the account owner is designated as the insured party of the insurance policy.

Additionally, establishing the insurance policy portion of the integrated account (block 105) may include storing an indication of type of payout or benefit of the insurance policy, and how the amount of said payout or benefit is to be calculated or determined. For example, if the insurance policy is a life insurance policy, the payout may be a death benefit (e.g., a lump or one-time payout). Similarly, the payout of a disability insurance policy may be a monthly disability payment, the payout of a long-term care insurance policy may be a periodic payment or disbursement, etc.

Generally, the amount of the payout or benefit may correspond to or track with the value of the investment vehicle portion of the integrated account, and as such, may vary over the lifetime of the insurance policy. In particular, the amount of the payout or benefit (whether lump or periodic) may be determined at the time of the payout based on a current balance of the investment vehicle portion of the integrated account at the time of the payout, e.g., based on a value of the total assets under management of the investment vehicle portion at the time of the payout. As such, the indication of the payout or benefit that is stored during the establishment of the insurance policy portion of the integrated account may indicate the predetermined conditions, terms, and/or calculations that are to be used to determine the amount of any payout or benefit at the time of the payout. For example, the payout amount or benefit of the insurance policy portion may be indicated to be an entirety of the total value of assets-under-management of the investment vehicle portion at the time of the payout. In another example, the payout amount may be indicated to be a portion of the value of total AUM of the investment vehicle portion at the time of the payout, e.g., a percentage, a fixed currency amount, or an entirety of the value of total AUM of a particular investment vehicle included in the investment vehicle portion. For situations in which multiple insurance policies are included in an integrated account, each different insurance policy may have respective (and potentially different) payout or benefit conditions and/or calculations.

The payout or benefit provided by the insurance policy portion of the integrated account may be separate and distinct from the actual assets under management of the investment vehicle portion of the integrated account. For example, consider an example scenario in which an account owner establishes an integrated account that has an initial principal value of $75,000 invested in the investment vehicle portion, and that has an insurance policy portion that provides life insurance with a predetermined death benefit of 100% of the value of assets under management. In this scenario, the value of AUM of the investment vehicle portion of the integrated account has increased to $100,000 at the time of the account owner's death. As such, a beneficiary of the integrated account may receive a $100,000 death benefit from the life insurance portion of the integrated account. However, as the insurance benefits are separate and distinct from the assets under management indicated in the investment vehicle portion of the integrated account, the beneficiary may also receive the $100,000 worth of assets under management. Of course, the account owner may designate a first party as the beneficiary of the life insurance policy, and may designate another party as the beneficiary of the funds invested in the investment vehicle.

At a block 108, the method 100 may include causing a received insurance application that has been included in or associated with the insurance policy portion of the integrated account to undergo underwriting. That is, at the block 108, the method 100 may cause an underwriting process to be performed on the insurance application. Typically, the underwriting process performed at the block 108 on an application for an insurance policy of an integrated account is a subset of a full underwriting process that would be required, designated, or typically performed for a similar, stand-alone insurance policy. Specifically, the underwriting process performed on an application for insurance provided by an integrated account may be a subset of an underwriting process that is recommended or designated for an application for a stand-alone, insurance policy in which the account owner is designated as the insured party. A stand-alone insurance policy, as generally referred to herein, is an insurance policy that provides a similar or same type of insurance as provided by an insurance policy of an integrated account. However, the stand-alone insurance policy is not linked or associated with any other investments of the insured party, either by integration or by some other type of operational dependency. For example, financial terms of a stand-alone insurance policy are not based on any balance, operating expense, or other parameters of any other investment account of the account owner. Typically, stand-alone insurance policies aim to maximize a benefit or amount of coverage and/or minimize insurance premium amounts. That is, stand-alone insurance policies typically aim to optimize the financial parameters of the stand-alone insurance policy without having the stand-alone insurance financial parameters being dependent on parameters of other investment accounts.

On the other hand, insurance policies of integrated accounts may aim to simply provide insurance coverage, which may or may not be an optimized amount of coverage, and whose premiums may or may not be optimized. Additionally or alternatively, insurance policies of integrated accounts may quickly provide an in-force insurance policy without having to wait for a full underwriting process to be performed. Indeed, in some scenarios, an integrated account may allow insurance to be automatically approved and immediately become in-force. As such, the simplified or pared-down underwriting that is caused to be performed at the block 108 may be possible as insurance policies of integrated accounts are dependent on the investment vehicle portions of integrated accounts.

Returning to the block 108, in an embodiment, the method 100 may cause the underwriting process to be performed by forwarding insurance policy application data to a computing device configured to perform or administrate the underwriting process. In another embodiment, the method 100 may cause the underwriting process to be performed (block 108) by transmitting an electronic notification to another computing device that is accessible to an underwriter. Of course, other techniques for causing the underwriting process to be performed may be additionally or alternatively utilized at the block 108.

Subsequently, at a block 110, the method 100 may include receiving an approval of the insurance application based on the completed underwriting process corresponding to the block 108. Based on the approved application, the in-force insurance policy may then be included in or associated with the insurance policy portion of the integrated account.

At a block 112, the method 100 may include causing one or more premiums of the in-force insurance policy to be paid by using at least a portion of the monies received from one or more operating expense assessments of the investment vehicle portion of the integrated account. In an example, at least a portion of the operating expenses of the one or more investment vehicles of the investment vehicle portion that have been assessed and collected may be applied to one or more premiums of the insurance policy. Thus, in effect, the cost or expense of the one or more insurance policies included in the insurance policy portion of the integrated account may be covered or borne by the operating expenses of the investment vehicle portion of the integrated account.

Accordingly, and as previously mentioned, while the investment vehicle portion of the integrated account remains active or open, the amount of coverage (e.g., the amount of the payout or benefit) provided by the insurance policy may vary over time as the value of assets under management of the investment vehicle portion varies due to investment gains and losses, assessed operating expenses, owner deposits, and/or owner withdrawals. However, even though the insurance benefit amount may vary, the insurance policy generally may remain in-force while the integrated account is active or open and the assessed operating expenses of the investment vehicle portion (and optionally additional payments provided by the account owner) cover the premiums. As such, an insurance policy provided by an integrated account may not have a fixed lifetime or term (e.g., ten years, fifteen years, etc.), but rather the term of the insurance policy may correspond to the lifetime of the investment vehicle portion, even if the particular investment vehicles included in or associated with the investment vehicle portion are changed over time. Of course, any of the one or more insurance policies included in the insurance policy portion of the integrated account may be canceled at any time by the account owner.

At a block 115, the method 100 may include updating the values of stored parameters of the integrated account based on, for example, a gain generated by the one or investment vehicles, a loss generated by the one or more investment vehicles, an assessment of an operating expense of the one or more investment vehicles, a deposit or withdrawal made by the account owner, etc. For example, the indication of respective current balances of the one or more investment vehicles may be updated. In some scenarios, other parameters of the integrated account may be updated. For example, the conditions or calculations used to determine the insurance payout may be updated to reflect a new agreement between the provider and the account owner.

Further, in some embodiments, at least a portion of the method 100 may be used to provide insurance using an integrated investment and insurance account by augmenting an existing investment account with one or more insurance policies to form the integrated account. For example, an account owner may establish or open a mutual fund account or other stand-alone investment vehicle account (block 102), and at some point during the lifetime of the existing investment account, the owner may desire to obtain insurance based on the existing, established investment account. The provider of the investment account may augment the existing, established investment account with an insurance policy portion (e.g., at the block 105, the provider may add an insurance policy portion to the existing investment account account), thereby generating an integrated investment and insurance account that has the previously established investment account as the investment vehicle portion (block 102), and that has the newly added insurance policy as the insurance policy portion (block 105).

It is further noted that in the discussion herein, the one or more investment vehicles associated with an integrated account may or may not be provided and/or administrated by the provider of the integrated account, and the one or more insurance policies associated with the integrated account may or may not be provided and/or administrated by the provider of the integrated account. For example, the provider of the integrated account may have an agreement with a provider of an investment vehicle to associate the investment vehicle with integrated investment and insurance accounts. Similarly, the provider of the integrated account may have an agreement with a provider of an insurance policy to associate the insurance policy with integrated investment and insurance accounts. In some embodiments, though, the provider of the integrated account may provide and administrate both the investment vehicles and the insurance policies which may be integrated into integrated investment and insurance accounts.

Figure 2:
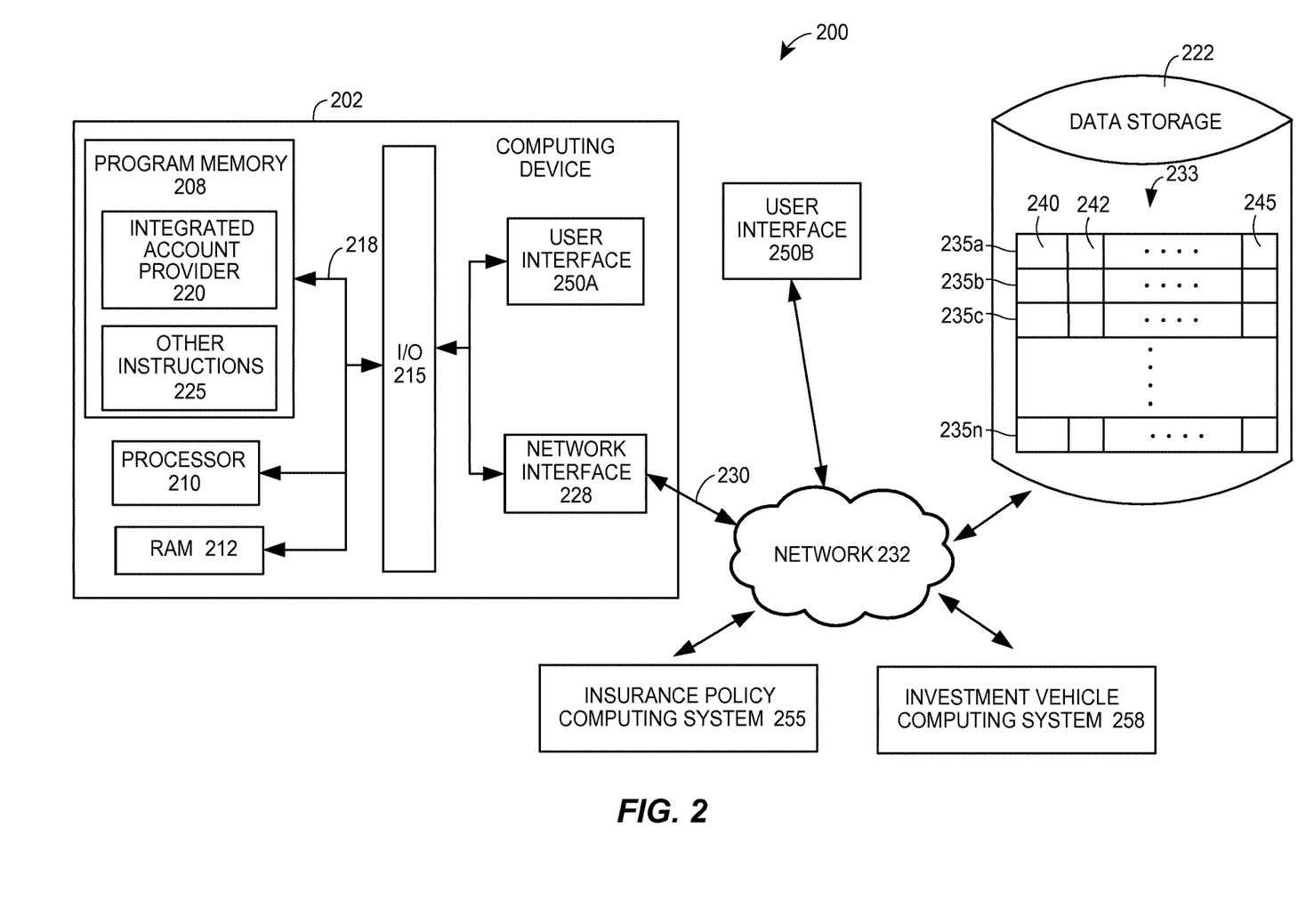
FIG. 2 is an example block diagram of a system for providing insurance using integrated investment and insurance accounts.

Turning now to FIG. 2, FIG. 2 illustrates a block diagram of an exemplary system 200 for providing insurance using integrated investment and insurance accounts (e.g., an "integrated account system"). The system 200 may execute at least a portion of the method 100, in an embodiment. In an embodiment, the system 200 may execute at least a portion of a method for providing insurance using integrated investment and insurance accounts other than the method 100.

The system 200 may include a computing device 202 which may be, for example, a computer, a server, a plurality of networked computing devices having a logical appearance of a single computing device, a plurality of cloud computing devices, etc. Accordingly, for ease of discussion only and not for limitation purposes, the computing device 202 is referred to herein using the singular tense, although in some embodiments the computing device 202 may include more than one physical computing device.

The computing device 202 may include a program memory 208, a processor 210 (may be called a controller, a microcontroller, or a microprocessor), a random-access memory (RAM) 212, and an input/output (I/O) circuit 215, all of which may be interconnected via an address/data bus 218. The program memory 208 may comprise one or more tangible, non-transitory computer-readable storage media or devices, and may be configured to store computer-readable instructions 220 that, when executed by the processor 210, cause the computing device 202 to provide integrated investment and insurance accounts. As such, the computing device 202 is particularly configured to provide integrated investment and insurance accounts at least due to the inclusion of the instructions 220 stored on the memory 208. In an embodiment, the instructions 220, when executed, may cause the computing device 202 to implement at least a portion the method 100 of providing an integrated investment and insurance account. For ease of discussion, the instructions 220 are referred to herein as the "integrated account provider 220."

The computing device 202 may be configured or adapted to access one or more data storage devices 222. For example, the integrated account provider 220 may be executable by the processor 210 to access the one or more data storage devices 222. Additionally or alternatively, another set of computer-executable instructions 225 may be executable by the processor 210 to access the one or more data storage devices 222. As such, the processor 210 may be in communicative connection with the one or more data storage devices 222.

The one or more data storage devices 222 may comprise, for example, one or more memory devices, a data bank, cloud data storage, or one or more other suitable data storage devices. In the embodiment illustrated in FIG. 2, the computing device 202 is shown as being configured to access the one or more data storage devices 222 via a network interface 228 that is coupled to a link 230 in communicative connection with the one or more data storage devices 222. The link 230 in FIG. 2 is depicted as a link to one or more private or public networks 232 (e.g., the one or more data storage devices 222 are remotely located from the computing device 202), although this is not required. The link 230 may include a wired link and/or a wireless link, or may utilize any suitable communications technology.

In an embodiment (not shown), at least one of the one or more data storage devices 222 is included in the computing device 202, and the processor 210 of the computing device 202 (or the instructions 220, 225 being executed by the processor 210) accesses the one or more data storage devices 222 via a link comprising a read or write command, function, primitive, application programming interface, plug-in, operation, or instruction, or similar.

The one or more data storage devices 222 may include one physical device, or the one or more data storage devices 222 may include more than one physical device. The one or more data storage devices 222, though, may logically appear as a single data storage device irrespective of the number of physical devices included therein. Accordingly, for ease of discussion only and not for limitation purposes, the data storage device 222 is referred to herein using the singular tense.

The data storage device 222 may be configured or adapted to store data related to the integrated account system 200. In an embodiment, the data storage device 222 includes a database or other suitable data storage format 233 that includes one or more entries 235a-235n. Each entry 235 may correspond to a particular integrated account. For example, the entry 235a corresponds to the account owner 240, which may be a person that is indicated by a value stored in the field 240.

Additionally or alternatively, each account entry 235 may include one or more indicators 242 configured or adapted to store respective values of one or more parameters corresponding to the investment vehicle portion of the integrated account 235, e.g., one or more parameters corresponding to the one or more investment vehicles included in or associated with the investment vehicle portion of the integrated account 235. For example, the one or more indicators 242 may include a field storing a value indicative of a current value of total assets under management of the account 235. Additionally or alternatively, when the integrated account 235 includes multiple investment vehicles, the one or more indicators 242 may include multiple fields, each of which stores a respective value indicative of a respective current value of AUM of each investment vehicle included in the integrated account 235. In some cases, the one or more indicators 242 may include one or more fields storing values indicative of how and how often operating expenses are to be assessed against the one or more investment vehicles included in the investment vehicle portion of the integrated account 235. For example, a different field may respectively indicate a respective operating expense protocol for a respective investment vehicle included in or associated with the integrated account 235. In some configurations, the one or more indicators 242 may indicate amounts of operating expenses that have been assessed and collected for the various investment vehicles. Further, in cases in which the provider of the integrated account does not provide or administrate a particular investment vehicle, the one or more indicators 242 may indicate the provider of the particular investment vehicle.

Additionally or alternatively, each entry 235 may include one or more indicators 245 whose values are indicative of various parameters of the insurance policy portion of the integrated account. For example, the field 245 may store a value indicative of how a payout or benefit of the insurance policy portion of the integrated account is to be determined at the time of payout. Other fields which may be included in the one or more insurance policy portion indicators 245 may include, for example, an indication of a type of insurance, and/or an amount and periodicity of an assessed premium of the insurance policy. If multiple insurance policies are included in the integrated account 235, respective indicators 245 for each insurance policy may be provided in the account entry 235. Further, in cases in which the provider of the integrated account does not provide or administrate a particular insurance policy, the one or more indicators 242 may indicate the provider of the particular insurance policy.

In an embodiment, the data storage device 222 may store other data related to providing integrated investment and insurance accounts. For example, the data storage device 222 may store one or more sets of integration rules, one or more sets of data to be procured and saved for tax or other governmental reasons, security and access permissions, contact and other information corresponding to the account owners, and/or other data corresponding to providing integrated investment and insurance accounts.

With further regard to FIG. 2, in an embodiment, the integrated account provider 220 may be configured or adapted to change or update the entries 235 and the values of the fields 240-245 included therein to reflect the current status of the integrated accounts. Generally, the integrated account provider 220 may administrate the entries 235 and the contents of the entries 235 to support providing integrated investment and insurance accounts. For example, the integrated account provider 220 may create a new entry 235n corresponding to a new integrated account for the same or for a different account owner, or the integrated account provider 220 may delete an entry 235b.

The integrated account provider 220 may update a value of the field 242 storing the investment vehicle portion information when a current state or status of the investment vehicle portion changes. In an embodiment, the integrated account provider 220 may change or update the entries 235 (or at least some portions of their contents and fields 242, 245) based on one or more explicit or implicit indications (e.g., triggers) received by the computing device 202. For example, the integrated account provider 220 may receive an explicit indication or a trigger indicating that a value of a particular investment vehicle has increased or decreased, and/or an explicit indication or trigger indicating that an operating expense has been assessed for a particular investment vehicle. Some explicit triggers may be received via a user interface 250A. For example, a trigger received via the user interface 250A may indicate that funds currently allocated under one particular investment vehicle are to be transferred into another investment vehicle. The user interface 250 may be integral to the computing device 202 (e.g., the user interface 250A), and/or the user interface may not be integral with the computing device 202 (e.g., the user interface 250B). For example, the user interface 250 may be a remote user interface 250B at a remote computing device, such as a web page or a client application.

In an embodiment, the integrated account provider 220 may receive an explicit indication or a trigger to change to one or more of the entries 235 via a link 230 that is communicatively connected to another computing device or system 255, 258. In an embodiment, the computing device 202 may receive a trigger, signal or message via the link 230 (and, optionally, via one or more private or public networks 232) from a computing device or system 255 at which insurance policy information is maintained and/or administrated. For example, the computing system 255 may store additional data or information corresponding to the insurance policy, such as policy terms, records of premium payments, personal information of the policyholder, status of underwriting, etc. In an embodiment, when insurance policy information is added, deleted, changed or updated at the computing system 255, the computing system 255 may correspondingly inform the integrated account provider 220 via the link 230.

In an embodiment, the computing device 202 may receive a trigger or message via the link 230 (and, optionally, via one or more private or public networks 232) from a computing device or system 258 at which investment vehicle information is maintained and/or administrated. For example, the computing system 258 may store additional data or information corresponding to the investment account such as account terms, records of accumulated interest, gains, distributions, or other transactions, personal information of the account owner, etc. In an embodiment, when investment account information is added, deleted, changed or updated at the computing system 258, the computing system 258 may correspondingly inform the integrated account provider 220 via the link 230.

In FIG. 2, although the computing device 202 is shown as being in communicative connection with a single computing system 255 corresponding to insurance policies, the computing device 202 may be in communicative connection to any number of computing systems 255 (e.g., zero, two, three, or more computing devices) corresponding to any number or types of insurance policies. For example, the computing device 202 may be in communicative connection with a first computing system corresponding to life insurance policies, and with a second system corresponding to disability insurance policies, and with yet a third system corresponding to long-term care insurance policies. In an embodiment, the computing device 202 may be included in (e.g., integral with) a computing system 255 corresponding to insurance policies.

Further, although in FIG. 2 the computing device 202 is shown as being in communicative connection with a single computing system 258 corresponding to investment accounts, the computing device 202 may be in communicative connection to any number of computing systems 258 (e.g., zero, two, three, or more computing devices) corresponding to any number or types of investment accounts. For example, the computing device 202 may be in communicative connection with a computing system corresponding to mutual fund accounts, and with another system corresponding to checking and savings accounts, and with yet another system corresponding to EFT accounts. In an embodiment, the computing device 202 may be included in (e.g., integral with) a computing system 258 corresponding to investment accounts.

Further, in some embodiments, the computing system 255 may be combined with the computing device 202 into an integral computing system, and/or the computing system 258 may be combined with the computing device 202 into an integral computing system. Indeed, in some embodiments, the computing systems 202, 255 and 258 may be provided by a single provider that provides both investment vehicles and insurance policies, and accordingly the computing systems 202, 255, 258 may be combined into an integral system.

Turning again to the computing device 202, while the integrated account provider 220 is shown as a single block in FIG. 2, it will be appreciated that the integrated account provider 220 may include a number of different programs, modules, routines, and sub-routines that may collectively cause the computing device 202 to implement the integrated account provider 220. It should be appreciated that although only one processor 210 is shown, the computing device 202 may include multiple processors 210. Additionally, although the I/O circuit 215 is shown as a single block, it should be appreciated that the I/O circuit 215 may include a number of different types of I/O circuits. Similarly, the memory of the computing device 202 may include multiple RAMs 212 and multiple program memories 208. Further, while the instructions for the integrated account provider 220 and the other instructions 222 are shown being stored in the program memory 208, the instructions may additionally or alternatively be stored in the RAM 212 or other local memory (not shown).

The RAM(s) 212 and program memories 208 may be implemented as semiconductor memories, magnetically readable memories, chemically or biologically readable memories, and/or optically readable memories, or may utilize any suitable memory technology. The computing device 202 may also be operatively connected to the network 232 via the link 230 and the I/O circuit 215. The network 232 may be a proprietary network, a secure public internet, a virtual private network or some other type of network, such as dedicated access lines, plain ordinary telephone lines, satellite links, combinations of these, etc. Where the network 232 comprises the Internet, data communications may take place over the network 232 via an Internet communication protocol, for example.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and systems described herein are illustrative only and are not limiting upon the scope of the claims.

What is claimed:

1. A system for providing insurance by using integrated investment and insurance accounts, the system comprising:
   a communications network;
   an insurance policy computing system to administer insurance policy information;
   an investment vehicle computing system to administer investment account information;
   a data storage device storing a respective entry corresponding to each of a plurality of integrated investment and insurance accounts, each integrated investment and insurance account including
      (i) a respective investment vehicle portion corresponding to funds invested by a respective owner of each integrated account in one or more investment vehicles, the one or more investment vehicles structured to return gains to the one or more investment vehicles so that the gains are available for immediate withdrawal by the respective owner, a value of the invested funds based upon principal amounts and returns, and the one or more investment vehicles having one or more beneficiaries who are designated to receive total assets under management (AUM) of the one or more investment vehicles at a time of death of the respective owner, and
      (ii) a respective insurance policy portion corresponding to one or more insurance policies, the one or more insurance policies including at least one of a life insurance policy, a disability insurance policy, a long-term care insurance policy, a personal liability insurance policy, or a personal umbrella insurance policy, each having the respective owner of the each integrated account designated as a respective insured party, and funds for a payout of at least one of the one or more insurance policies being provided from funds other than actual AUM of the one or more investment vehicles,
      the respective entry including an indication of the respective owner, an indication of an operating expense of the respective investment vehicle portion, and an indication of a premium of the insurance policy portion; and
   an integrated account provider including a non-transitory computer-readable memory storing computer-executable instructions and a processor, the integrated account provider communicatively coupled to the data storage device via a first link to the communications network to access and update a plurality of entries stored in the data storage device, communicatively coupled to the insurance policy computing system via a second link to the communications network, and communicatively coupled to the investment vehicle computing system via a third link to the communications network, wherein the computer-executable instructions, when executed by the processor, cause the integrated account provider to:
      establish the respective investment vehicle portion of the each integrated account, the respective investment vehicle portion including an indication of an amount of funds invested by the respective owner of the each integrated account in one or more investment vehicles, and an indication of an operating expense assessed on at least a part of the amount of funds;
      establish the respective insurance policy portion of the each integrated account, the respective insurance policy portion including an indication that an amount of the payout of the at least one of the one or more insurance policies is to be determined based on a value of total AUM of the one or more investment vehicles at a time of the payout;
      cause at least a portion of the operating expense assessed on the at least the part of the amount of funds to be paid towards a premium of the at least one of the one or more insurance policies, thereby providing insurance for the respective owner;
      receive, at a user interface of the integrated account provider via a first link to the communications network, one or more indications of at least one of a change to the one or more insurance policies from the insurance policy computing system, or a change to the one or more investment vehicles from the investment vehicle computing system; and
      trigger, in response to the one or more indications received via the user interface, updates, via a network interface and a second link to the communications network, to one or more of the plurality of the entries stored in the data storage device via an application programming interface, the one or more of the plurality of entries updated based on the received one or more indications.

2. The system of claim 1, wherein
   the one or more investment vehicles include one or more of: a mutual fund, a certificate of deposit, a savings account, a checking account, an exchange-traded fund (ETF), a brokerage account, an investment management account, or an interest bearing vehicle, and
   the at least one of the one or more insurance policies further include another type of insurance policy having the respective account owner designated as the respective insured party.

3. The system of claim 1, wherein the operating expense is at least one of (i) a fixed monetary amount, or (ii) a percentage of total AUM at least one investment vehicle included in the one or more investment vehicles.

4. The system of claim 1, wherein at least a portion of the operating expense is assessed periodically.

5. The system of claim 1, wherein the at least one of the one or more insurance policies corresponding to the each integrated account and designating the respective account owner as the insured party has been approved by an underwriting process that is a subset of an underwriting process for a stand-alone insurance policy that designates the respective account owner as the insured party and that provides a same type of insurance as provided by the at least one of the one or more insurance policies.

6. The system of claim 1, wherein the amount of the payout of the at least one of the one or more insurance policies at the time of the payout comprises at least one of an entirety of the value of the total AUM of the one or more investment vehicles at the time of the payout, a predetermined percentage of the value of the total AUM of the one or more investment vehicles at the time of the payout, a fixed, predetermined amount, an amount within a range of a predetermined minimum amount and a predetermined maximum amount, or a value of total AUM of a particular investment vehicle included in the one or more investment vehicles at the time of the payout.

7. The system of claim 1, wherein at least one of the one or more investment vehicles comprise multiple investment vehicles, or the at least one of the one or more insurance policies comprises multiple insurance policies.

8. The system of claim 1, wherein the insurance policy computing system is to send a first indication to the integrated account provider in response to a change in an insurance policy, and the investment vehicle computing system is to send a second indication to the integrated account provider in response to a change in an investment vehicle.

9. A system for providing insurance by using an integrated investment and insurance account, the integrated investment and insurance account being an integrated account, and the system comprising:

an investment vehicle computing system to administer investment account information;

a data storage device storing an entry corresponding to the integrated account, the entry including an indication of an owner of the integrated account, an indication of an operating expense of an investment vehicle portion of the integrated account, and an indication of a premium of an insurance policy portion of the integrated account, the investment vehicle portion corresponding to funds invested by the owner of the integrated account in one or more investment vehicles, the one or more investment vehicles structured to return gains to the respective owner for immediate use, a value of the invested funds based upon principal amounts and returns, the one or more investment vehicles having one or more beneficiaries who are designated to receive total assets under management (AUM) of the one or more investment vehicles at a time of death of the respective owner, and the operating expense assessed on at least one of the one or more investment vehicles, the insurance policy portion corresponding to one or more insurance policies, the one or more insurance policies including at least one of a life insurance policy, a disability insurance policy, a long-term care insurance policy, a personal liability insurance, or a personal umbrella insurance policy, each having the integrated account owner designated as a respective insured party, and funds for a payout of at least one of the one or more insurance policies being provided from funds other than actual AUM of the one or more investment vehicles; and a computing device coupled to the data storage device, the insurance policy computing system, and the investment vehicle computing system via one or more links to a communications network, the computing device including:

a processor; and a memory storing a set of computer-executable instructions that, when executed by the processor, cause the computing device to:

provide a user interface;

cause at least a portion of the assessed operating expense of the investment vehicle portion of the integrated account to be applied towards an assessed premium of the at least one of the one or more insurance policies, thereby providing insurance coverage for the integrated account owner;

determine an amount of the payout of the at least one of the one or more insurance policies based on a value of total AUM of the one or more investment vehicles at a time of the payout; and in response to the user interface detecting a notification via one of the one or more links to the communications network form at least one of the insurance policy computing system or the investment vehicle computing system, access an application programming interface of the data storage device to update the entry in the data storage device based on the notification, the notification representing at least one of a change to the one or more insurance policies from the insurance policy computing system, or a change to the one or more investment vehicles from the investment vehicle computing system.

10. The system of claim 9, wherein:

the one or more investment vehicles include at least one of a mutual fund, a certificate of deposit, a savings account, a checking account, an exchange-traded fund (ETF), a brokerage account, an investment management account, or an interest bearing vehicle; and each of the one or more investment vehicles has a respective current balance that is updated based on at least one of a gain generated by the one or more investment vehicles, a loss generated by the one or more investment vehicles, additional funds contributed by the integrated account owner, or the assessment of the operating expense.

11. The system of claim 9, wherein at least a portion of the operating expense is assessed periodically.

12. The system of claim 9, wherein the one or more insurance policies further include another type of insurance policy for which a respective insured party is the integrated account owner.

13. The system of claim 9, wherein the insurance policy designating the integrated account owner as the insured party and provided by the insurance policy portion of the integrated account is an insurance policy that has been approved by a particular underwriting process, and the particular underwriting process is a subset of an underwriting process for a stand-alone insurance policy that designates the integrated account owner as the insured party and that provides a same type of insurance as the particular insurance policy.

14. The system of claim 9, wherein the amount of the payout of the insurance policy at the time of the payout comprises at least one of an entirety of the value of the total AUM of the one or more investment vehicles at the time of the payout, a predetermined percentage of the value of the total AUM of the one or more investment vehicles at the time of the payout, a predetermined amount corresponding to the value of the total AUM of the one or more investment vehicles at the time of the payout, an amount within a range of a predetermined minimum amount and a predetermined maximum amount corresponding to the total AUM of the one or more investment vehicles at the time of the payout, or a value of total AUM of a particular investment vehicle included in the one or more investment vehicles at the time of the payout.

15. The system of claim 9, wherein the entry further includes at least one of an indication of a total current balance of the one or more investment vehicles, an indication of a respective current balance of at least one of the one or more investment vehicles, an indication of another parameter of the one or more investment vehicles, an indication of a type of insurance provided by the insurance policy, an indication of an amount of the premium of the insurance policy, or an indication of another parameter of the insurance policy.

16. A system for providing insurance via an integrated investment and insurance account, the system comprising:
a data storage device storing a plurality of entries corresponding to each of a plurality of integrated investment and insurance accounts,
  each integrated investment and insurance account including: (i) a respective investment vehicle portion corresponding to funds invested by a respective owner of the each integrated account in one or more investment vehicles, the one or more investment vehicles structured to return gains to the respective owner for immediate use, a value of the invested funds based upon principal amounts and returns, and the one or more investment vehicles having one or more beneficiaries who are designated to receive total assets under management (AUM) of the one or more investment vehicles at a time of death of the respective owner, and (ii) a respective insurance policy portion corresponding to one or more insurance policies, the one or more insurance policies including at least one a life insurance policy, a disability insurance policy, a long-term care insurance policy, a personal liability insurance policy, or a personal umbrella insurance policy, each having the respective owner of the each integrated account designated as a respective insured party, and funds for a payout of at least one of the one or more insurance policies being provided from funds other than actual AUM of the one or more investment vehicles, and
  each entry corresponding to the each integrated account including an indication of the respective owner, an indication of an operating expense of the respective investment vehicle portion, and an indication of a premium of the respective insurance policy portion;
a computing device including:
  a processor;
  a first network interface to communicatively couple the computing device to the data storage device via a first link;
  a second network interface to communicatively couple the computing device to an insurance policy computing system that administers insurance policy information via a second link;
  a third network interface to communicatively couple the computing device to an investment vehicle computing system that administers investment account information via a third link;
  a memory; and
  a set of computer-executable instructions stored on the memory of the computing device, the computer-executable instructions executable by the processor to cause the computing device to:
    provide a user interface;
    augment an established investment account with an application for an insurance policy to generate the new integrated account, wherein the established investment account has been opened by a particular account owner and has an operating expense, the particular account owner is designated as an insured party who is to be covered by a particular insurance policy, and an amount of a payout of the particular insurance policy is to be determined based on a value of total AUM of the established investment account at a time of the payout;
    cause an underwriting process to be performed on the application for the particular insurance policy, the underwriting process being a subset of an underwriting process designated to be performed for an application for a stand-alone insurance policy that does not augment any investment account of the particular account owner;
    receive an approval from the underwriting process performed on the application of the particular insurance policy and, based on the approval, include the approved, particular insurance policy in the new integrated account;
    create a new entry in the data storage device corresponding to the new integrated account, wherein the established investment account is indicated in the investment vehicle portion of the new integrated account and the particular insurance policy is indicated in the insurance policy portion of the new integrated account;
    cause at least a portion of monies received in response to an assessment of the operating expense on the established investment account to be paid towards a premium of the particular insurance policy, thereby providing insurance for the particular account owner; and
    in response to the user interface detecting a trigger from the insurance policy computing system via the second link and the second network interface, or the investment vehicle computing system via the third link and the third network interface, interact with the data storage device via an application programming interface of the data storage device to update the entry in the data storage device based on the trigger, the trigger representing at least one of a change to the one or more insurance policies from the insurance policy computing system, or a change to the one or more investment vehicles from the investment vehicle computing system.

17. The system of claim 16, wherein
the one or more investment vehicles include one or more of a mutual fund, a certificate of deposit, a savings account, a checking account, an exchange-traded fund (ETF), a brokerage account, an investment management account, or an interest bearing vehicle, and
the one or more insurance policies further include another type of insurance policy for which the particular owner of the established investment account is designated as the respective insured party.

18. The system of claim 16, wherein the operating expense of the one or more investment vehicles includes at least one of a fixed monetary amount or a percentage of total AUM of at least one of the one or more investment vehicles.

19. The system of claim 16, wherein the payout of the particular insurance policy comprises at least one of
- a predetermined percentage of the value of the AUM of the established investment account at the time of the payout,
- a predetermined monetary amount,
- an amount within a range of a predetermined minimum monetary amount and a predetermined maximum monetary amount, or
- a value of total AUM of a particular investment vehicle included in one or more investment vehicles associated with the established investment account at the time of the payout.

* * * * *